No. 793,999. PATENTED JULY 4, 1905.
L. E. EVSLIN.
MEANS FOR SECURING ARTIFICIAL TEETH TO DENTAL PLATES.
APPLICATION FILED JUNE 11, 1904.

Witnesses:
Inventor
Leo E. Evslin
By James L. Norris
Atty

No. 793,999.

Patented July 4, 1905.

UNITED STATES PATENT OFFICE.

LEO EDWARD EVSLIN, OF PARIS, FRANCE.

MEANS FOR SECURING ARTIFICIAL TEETH TO DENTAL PLATES.

SPECIFICATION forming part of Letters Patent No. 793,999, dated July 4, 1905.

Application filed June 11, 1904. Serial No. 212,183.

*To all whom it may concern:*

Be it known that I, LEO EDWARD EVSLIN, dentist, a subject of the Emperor of Russia, residing at 7 Rue Chambiges, in the city of Paris, Republic of France, have invented an Improved Means for Securing Artificial Teeth to Dental Plates, of which the following is a full, clear, and exact description.

This invention relates to an improved means for securing artificial teeth to dental plates; and it consists in providing the porcelain tooth with a V or T shaped dovetailed groove, straight or wedge-shaped. This groove distinguishes itself from the other grooves of same shape by the fact that instead of having the same external opening upon the whole length of the back portion of the tooth the groove stops at about the first third of its length, extending from the cervical border and ends at the front at about three-quarters of the length of the tooth. This arrangement enables this form of tooth to be used in case of close bites and for or in connection with rubber plates. A recess is made in the porcelain throughout the whole width of the back part of the cervical border running from side to side. The same cervical border $g$ at its very extremity is comparatively long and serves for the purpose of adjustment to the dental plate or to the root, whatever the case may be, so that the adjustment having been performed does not in any case reach the recess. Adapted to fit into this groove of special shape is a metallic tongue, which will be hereinafter described, for securing the tooth to a dental plate.

This invention is represented in the accompanying drawings, in which—

Figure 1:
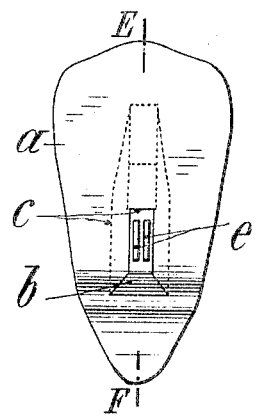
Figure 2:
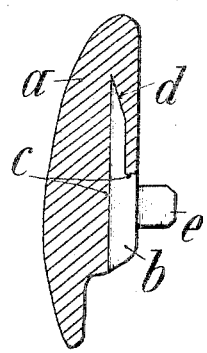
Figure 3:
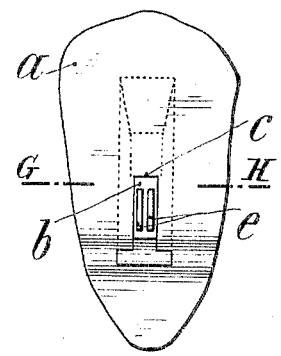
Figures 6, 7, 8:
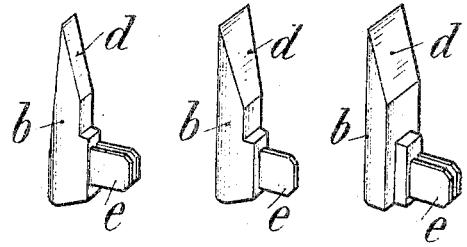
Figure 4:
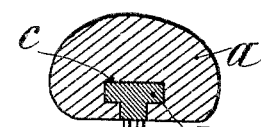
Figure 5:
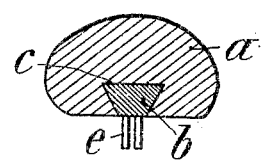
Figure 9:
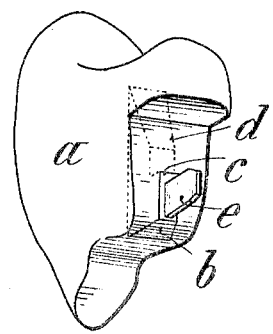
Figure 10:
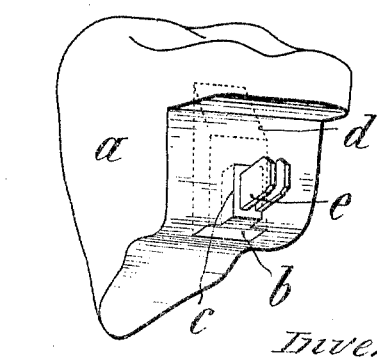

Figure 1 is a back view of a tooth provided with the improved means for securing the same to a plate. Fig. 2 is a section made according to line E F of Fig. 1. Fig. 3 is a view similar to Fig. 1, showing a modified form of tongue. Fig. 4 is a similar view made according to line G H of Fig. 3. Fig. 5 is a similar view, showing a modification. Figs. 6, 7, and 8 are detail views of the metallic tongue. Fig. 9 shows the metallic tongue applied to a bicuspid. Fig. 10 shows the same tongue applied to a molar.

In the several figures the same letters of reference denote the same parts.

As shown in the drawings, $a$ is the porcelain body of the tooth, in which is provided the groove of special shape $c$, in which a metallic tongue $b$ is adapted to fit. This tongue shows at its upper part a sloping portion $d$ and is provided with two projecting strips $e$, enabling to secure the tooth to a dental plate or to adapt a metal backing with the hole in the center, and the two projecting parts slit apart, so as to hold the backing in place and hereafter to be soldered to. At this point I may emphasize the practical value of the recess $f$ when the tooth is employed for rubber work—that is to say, when the metal part or the projections thereof are being embedded in the rubber the recess finds itself placed in the rubber and serves as a support to the tooth or rather to the groove in holding the tooth in position. For metal-work, after the backing has been adjusted to the back part of the tooth and being held in position by the splitted projections, the upper or cervical part of the backing, which is left longer, is being burnished into and over the recess, so that the tooth finds itself held at its upper part by a shoulder formed on one hand by its recess and on the other by the corresponding elevation or shoulder of the backing.

This new arrangement shows this advantage: that the solid portion left by the groove in virtue of the decrease of external opening considerably increases the strength of the tooth, which is thus less liable to break during mastication.

Having now described my invention, I declare that what I claim is—

An artificial tooth having a dovetail groove opening out therefrom at one side and at one end, the said groove being terminally continuous with a deep recess extending downwardly in the body of the tooth toward the point of the latter, the inner wall of the recess continuing in a straight plane from the inner wall of the groove, the terminal of the recess in the body of the tooth being reduced with respect to the remaining portion of said recess, and a metallic tongue similar in contour to the groove and recess and inserted in the latter for securing the tooth to a dental plate, the tongue being mainly inclosed within the tooth and longitudinally slidable into the groove and recess from the open end of the said groove.

The foregoing specification of my improved means for securing artificial teeth to dental plates signed by me this 25th day of May, 1904.

LEO EDWARD EVSLIN. [L. S.]

Witnesses:
    JOHN STUTZ,
    HANSON C. COXE.